No. 833,999. PATENTED OCT. 23, 1906.
J. A. COMER.
APPARATUS FOR EXTRACTING GOLD.
APPLICATION FILED JAN. 2, 1904.

3 SHEETS—SHEET 1.

WITNESSES:
INVENTOR
Joseph A. Comer
BY
James R. Rogers
ATTORNEY

No. 833,999. PATENTED OCT. 23, 1906.
J. A. COMER.
APPARATUS FOR EXTRACTING GOLD.
APPLICATION FILED JAN. 2, 1904.

3 SHEETS—SHEET 2.

WITNESSES:
INVENTOR
Joseph A Comer
BY
James R. Rogers
ATTORNEY

No. 833,999. PATENTED OCT. 23, 1906.
J. A. COMER.
APPARATUS FOR EXTRACTING GOLD.
APPLICATION FILED JAN. 2, 1904.
3 SHEETS—SHEET 3.
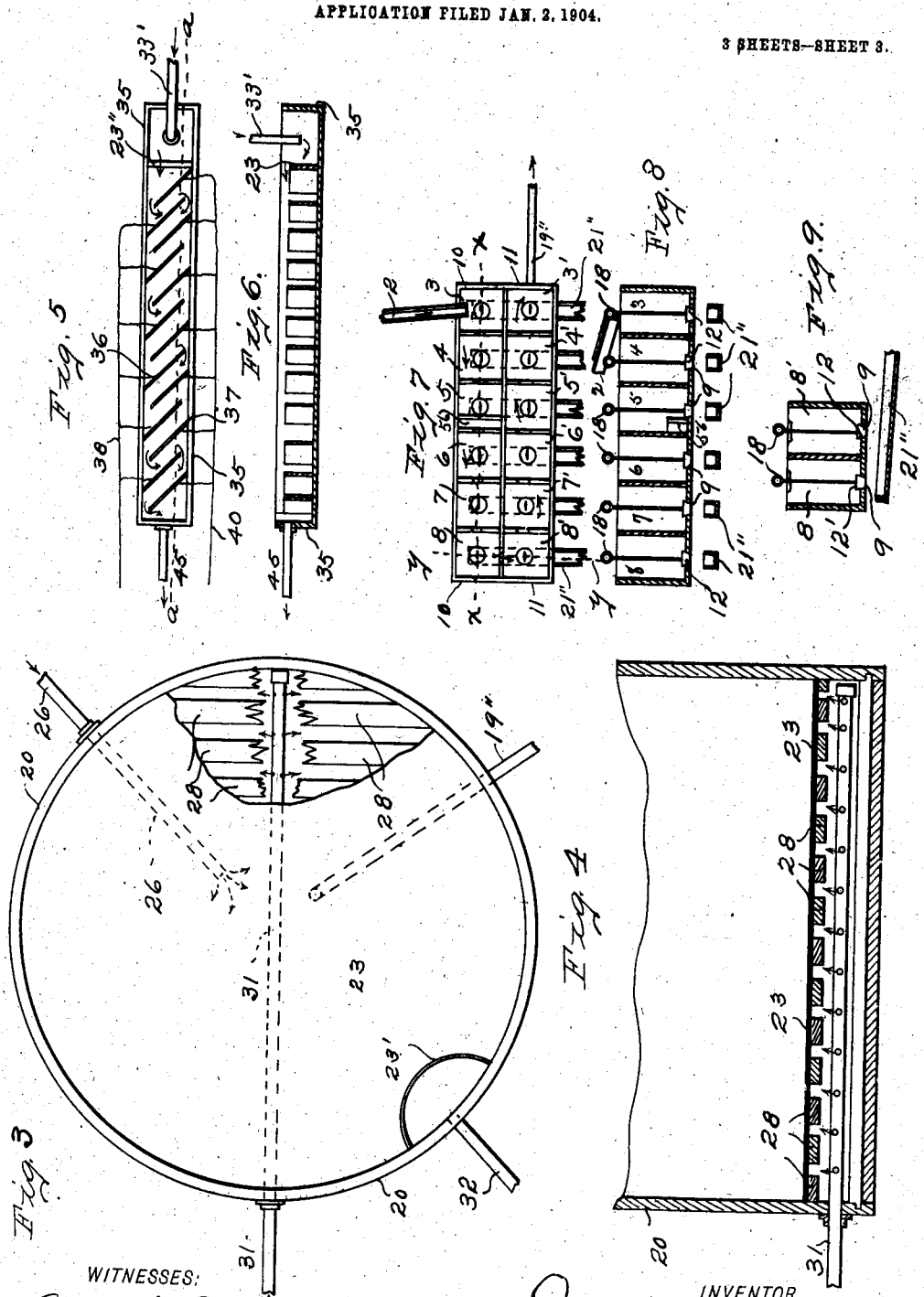
WITNESSES:
INVENTOR
Joseph A Comer
BY
James R Rogers
ATTORNEY

UNITED STATES PATENT OFFICE.

JOSEPH A. COMER, OF LOS ANGELES, CALIFORNIA.

APPARATUS FOR EXTRACTING GOLD.

No. 833,999.  Specification of Letters Patent.  Patented Oct. 23, 1906.

Application filed January 2, 1904. Serial No. 187,577.

*To all whom it may concern:*

Be it known that I, JOSEPH A. COMER, a citizen of the United States, residing at Los Angeles, in the county of Los Angeles, State of California, have invented and discovered a new and useful apparatus for extracting gold, silver, and other metals from ores by cyanid of potassium and precipitating the gold, silver, and other metals by electricity or zinc shavings; and I do hereby declare the following to be a full, clear, and exact description of the invention, such as will enable others skilled in the art to which it appertains to make and use the same.

This invention relates to improvements in an apparatus for extracting gold, silver, and other ores with a solution of cyanid of potassium and precipitating the gold, silver, and other metals by electricity or zinc shavings; and the objects of my improvement are, first, to arrange and connect a series of devices for economically handling, conveying, and reconveying the pulp of the crushed and screened ores and the metallic solution extracted therefrom by the cyanid-of-potassium solution from one of the said devices to the other; second, to separate the said cyanid solution carrying the gold, silver, and other metals from sedimentary deposits and conveying the said solution upward through filters in the presence of compressed air; third, to conduct the said solution carrying gold, silver, and other metals dissolved therein clear and free from slimes into electrolytic tanks, where the gold, silver, and other metals soluble in the solution are deposited by electricity or zinc shavings, reference being made to the accompanying drawings and to reference-numerals marked thereon.

The invention consists, essentially, in the construction, combination, and arrangement of the several parts, as will be hereinafter fully described in the specification, shown upon the drawings appended hereto, and specifically pointed out in the claims made a part hereof.

I attain these objects by the construction and arrangement of the several parts and by the mechanism illustrated in the accompanying drawings, in which—

Figure 1:
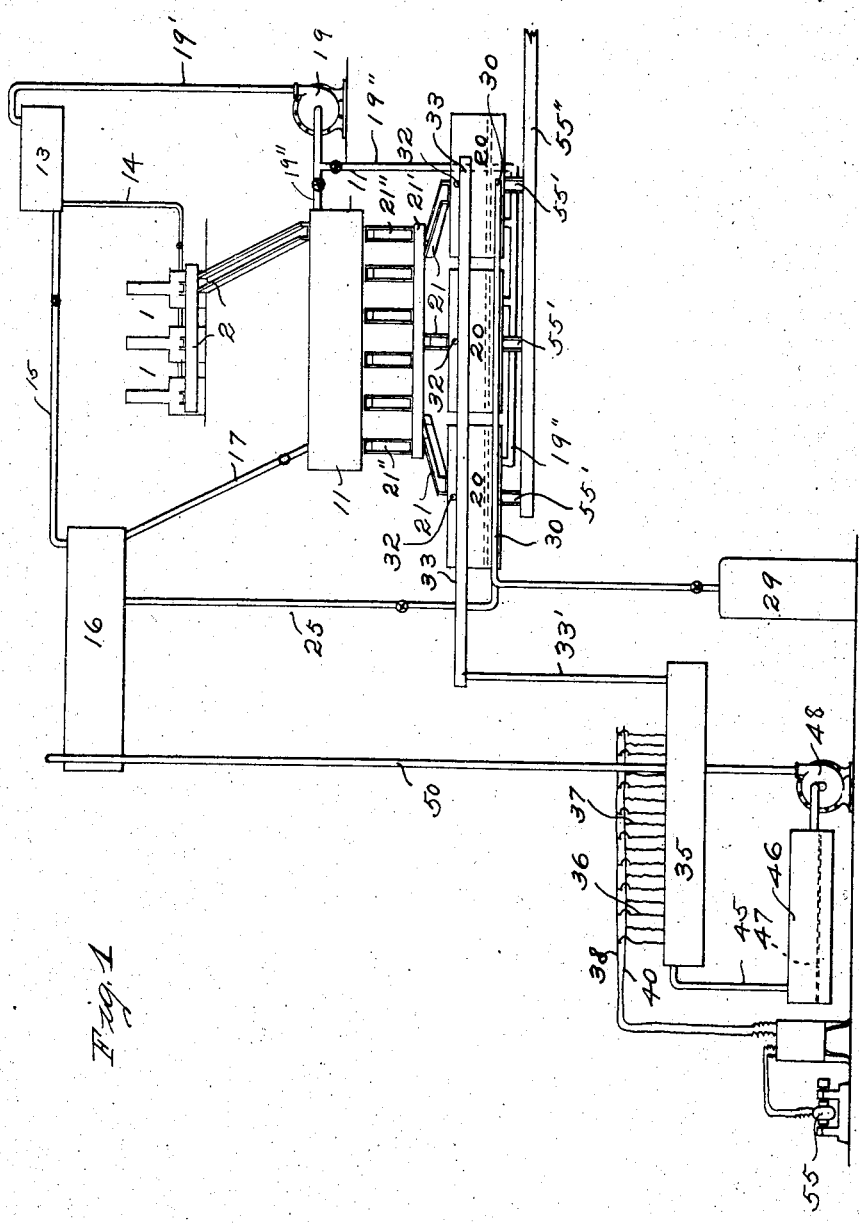
Figure 2:
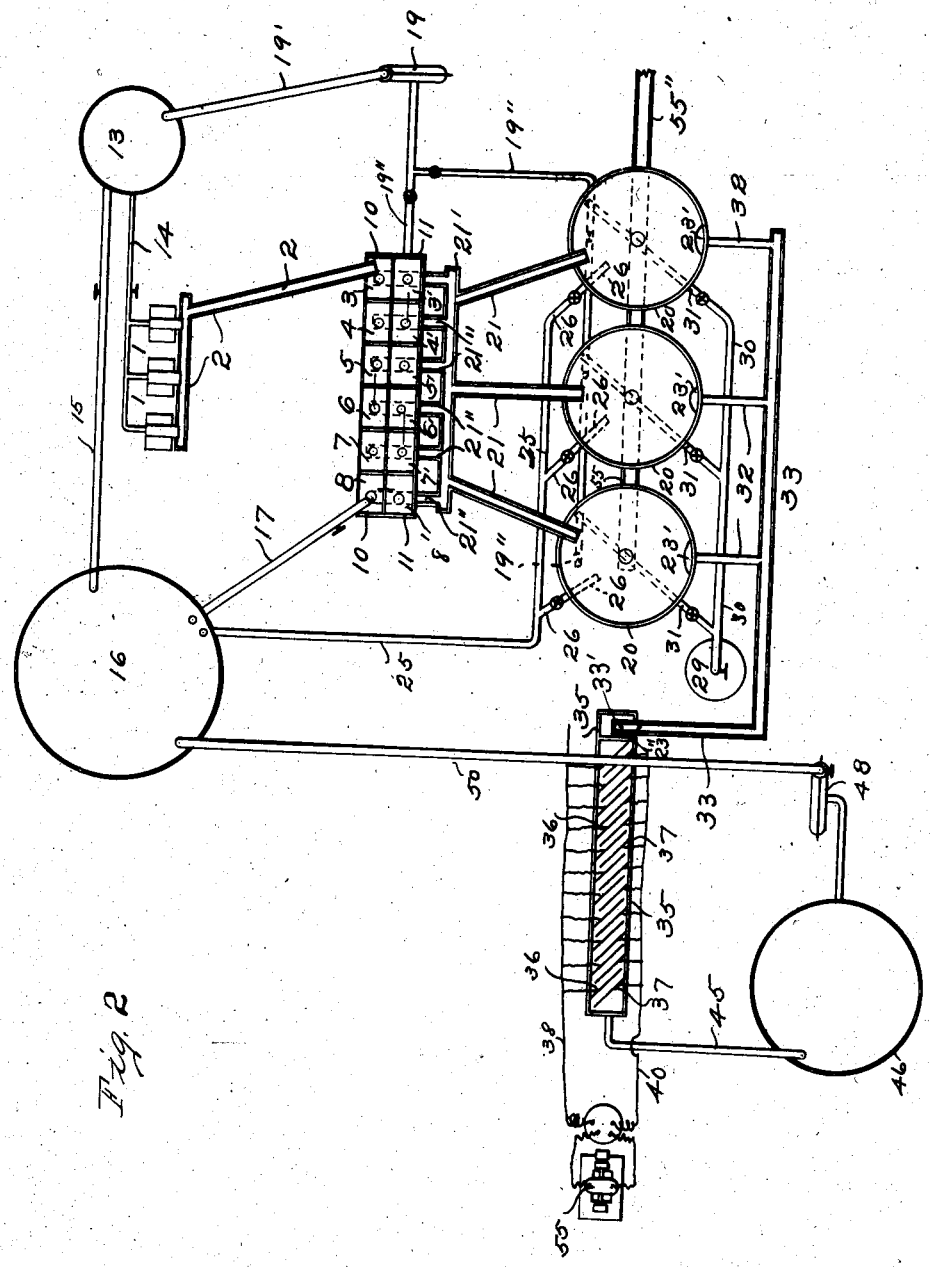

Figure 1 is a view in elevation of my improved apparatus. Fig. 2 is a plan view of the same. Fig. 3 is a plan view of one of the leaching and filtering tanks, showing a portion of the filter and the slats supporting the same located therein near the bottom broken away and the solution and compressed-air pipes illustrated in full and dotted lines. Fig. 4 is a sectional view taken through one of the leaching and filtering tanks, illustrating the filter, the supporting-slats in section, and the compressed-air pipe in elevation. Fig. 5 is a plan view of the electrolytic tank, showing the anode and cathode plates located therein, the wires connected thereto, and portions of the pipes for conveying the cyanid solution to and from the said tank. Fig. 6 is a longitudinal sectional view of the tank shown upon Fig. 5 of the drawings, taken on the line $a\ a$ thereof. Fig. 7 is a plan view of the series of pulp-settling tanks, showing the open chutes or launders for conveying the pulp solution to and from the same and a water-pipe leading from one of the compartments thereof. Fig. 8 is a longitudinal sectional view taken on the line $x\ x$ of Fig. 7, and Fig. 9 is a cross-sectional view taken on the line $y\ y$ of Fig. 7.

Similar numerals refer to like parts throughout the several views upon the drawings.

The reference-numerals 1 1 denote the stamp-mill for crushing the ores.

2 refers to the chute or launder for conveying the crushed ores into the pulp-settling tanks 10 and 11, the first of which is subdivided into compartments 3, 4, 5, 6, 7, and 8, and the latter tank 11 is subdivided into compartments 8', 7', 6', 5', 4', and 3'. Each of the said compartments is provided with openings 9 9, into which a plug 12 is adapted to be secured, the said plug having a long handle 18 extending above the upper edge of the said tanks 10 and 11 for removing the same.

The reference-numeral 13 represents the weak-cyanid-solution tank. In this tank, however, a weak solution of the cyanid of potassium is always to be found.

The numeral 19 refers to the circulating-pump, 19' to the weak-cyanid-solution pipe leading from the pump 19 to the tank 13, and 19" represents pipes for conveying weak cyanid solution from the pulp-settling tanks 10 and 11 to leaching-tanks 20 20, respectively.

From the weak-cyanid-solution tank 13 weak cyanid solution is conveyed, by means of the pipe 14, upon the ores while the same are being crushed by the stamp-mill 1 1, and through the pipe 15 weak cyanid solution is conducted into the cyanid-of-potassium tank 16. In this tank 16, hereinafter denominated the "cyanid-tank," a standard solution of the cyanid of potassium is kept in store ready for use. This standard solution of the cyanid of potassium in said tank 16 will hereinafter be referred to as the "cyanid solution."

By means of the pipe 17 leading from the cyanid-tank 16 into the compartment 8 of the pulp-settling tank 10 the said cyanid solution in the said cyanid-tank is conveyed into the said compartment 8 of the tank 10, where it is brought into contact with and intimately mixed with the crushed ore and the water passing through the stamp-mill 1 1 while the ore is being crushed. The said crushed ore and weak cyanid solution are also conveyed into the said pulp-settling tank 10 by means of the chute or launder 2.

The cyanid solution carrying the gold, silver, and other metals in solution and sedimentary deposits suspended therein are drawn off by means of the chutes or launders 21" 21' from the lower portions of the pulp-settling tanks 10 and 11 and are conveyed over the upper edges and into a series of leaching and filtering tanks 20 20 by means of the open chutes or launders 21 21. Said cyanid solution, with the gold, silver, and other metals in solution and sedimentary deposits suspended therein, fall upon the upper surfaces of filters 23 23, secured in the lower portions of the said leaching and filtering tanks 20 20.

In order to dissolve any metals remaining in the ores, a supply of the standard cyanid solution in the said cyanid-tank 16 is now conveyed, by means of the pipe 25 and the branch pipes 26 26 thereof, into the said leaching and filtering tanks 20 20, near the lower portions thereof, and under the filters 23 23 and the supporting-slats 28 28 therefor, where the said standard cyanid solution is intimately mixed with compressed air conveyed into the said leaching and filtering tanks 20 20 and under the said filters 23 23 and supporting-slats 28 28 by means of the pipe 30 and the branch pipes 31 31, connected to and leading from the air-compressor 29. The said solution in the lower portions of the leaching and filtering tanks 20 20, thoroughly impregnated with the compressed air under the filters 23 23, gently and in a quiescent state passes upward through the said filters, and the said cyanid solution carrying the gold, silver, and other metals and the suspended sedimentary deposits from the settling-tanks 10 and 11, the latter being thoroughly permeated with compressed air, becomes fluffy and flocculent and are easily separated from the cyanid solution by means of the filters 23 and 23'. Located near the upper edges of the leaching and filtering tanks 20 20 are the open ends of the outlet-pipes 32 32, leading into the open chute or launder 33, connected with the pipe 33', for conveying the filtered aerated cyanid solution into the electrolytic tank 35, the said cyanid solution carrying the gold, silver, and other metals in solution, free from sedimentary deposits, slimes, and other foreign matter. Through the filter 23" the said solution passes in order to be assured that all slimes and foreign matters have been abstracted therefrom before being brought in contact with the arranged anode and cathode plates 36 and 37, respectively, located within the said tank 35. The said sedimentary deposits are carried off from the leaching and filtering tanks 20 20 by means of the launders 55' and 55". To the anode-plate 36 and the cathode-plate 37 wires 38 and 40, respectively, are connected leading to the electro-generator 55.

After all the gold, silver, and other metals have been deposited upon the plates contained in the cyanid solution the remaining portion of the solution is conveyed, by means of the pipe 45, into the sump-tank 46, provided with a filter 47 near the lower portion thereof, under which filter a layer of lime is placed for further correcting the acidity of the cyanid solution from which the said metals have been deposited before returning the said solution, by means of the pump 48 and the pipe 50, into the cyanid-tank 16. In the receptacle 56 of the pulp-settling tank 10 lime or other alkalies are placed to neutralize the acidity of the cyanid solution.

The tailings from the settling-tanks 10 and 11 after having passed through the same and all the gold, silver, and other metals at first available having been extracted from them are again prepared for further treatment with a solution of the cyanid of potassium in order to extract all the gold, silver, and other metals therefrom.

It will readily appear from the foregoing description, when read in connection with the drawings hereto appended and made a part of the specification and claims, what is the operation of my invention, and further description of the manner of operating my improved apparatus is deemed unnecessary.

It is obvious that many variations and changes in the details of construction and arrangement of my invention would readily suggest themselves to persons skilled in the art and still be within the spirit and scope of my invention.

I do not desire to confine this invention to the specific construction, combination, and arrangement of parts herein shown and described, and the right is reserved to make all changes in and modifications of the same as come within the spirit of this invention; but I do desire to secure as my invention all features of construction and equivalents thereof as come within the scope of my improvement as herein shown and described, and illustrated upon the drawings appended hereto.

Having described my invention, what I do claim, and desire to secure by Letters Patent, is—

1. An apparatus for extracting gold, silver and other metals from ores by a solution of cyanid of potassium, comprising a series of settling-tanks communicating with each other, the cyanid-tanks, means for connecting said cyanid-tanks together, means for conveying the cyanid solution from the settling-tanks into the cyanid-tanks and from the cyanid-tanks again into the settling-tanks.

2. An apparatus for extracting gold, silver and other metals from ores by an alkaline solution of the cyanid of potassium, comprising a series of settling-tanks communicating with each other near the upper portion thereof and having partitions therein, the cyanid-tanks, means for connecting the said cyanid-tanks together, means for conveying the cyanid solution from one of the settling-tanks into one of the cyanid-tanks, and from one cyanid-tank into the other cyanid-tank and from one of the cyanid-tanks again into one of the settling-tanks.

3. In an apparatus for extracting gold, silver and other metals from ores by the solution of cyanid of potassium, a settling-tank for extracting said metals from crushed ores by the said solution, leaching and filtering tanks provided with inlets near the bottom thereof, connections through which the cyanid solution carrying the gold, silver and other metals and compressed air are conveyed into said leaching and filtering tanks and means for separating sedimentary deposits from said solution.

4. An apparatus for extracting gold, silver and other metals from ores by a solution of cyanid of potassium, a pulp-settling tank in which said metals are extracted from the ores by the said solution, leaching and filtering tanks, pipes extending into said leaching and filtering tanks near the lower portions thereof for conducting compressed air therein, pipes connected with said pulp-settling tanks for conveying the said cyanid solution of potassium carrying gold, silver and other metals dissolved therein and sedimentary deposits into the upper portion of said tanks, filters located near the lower portion within said tanks for separating said deposits from the said cyanid solution.

5. An apparatus for extracting gold, silver and other metals from ores, comprising a series of pulp-settling tanks, a weak-cyanid-solution tank, a cyanid-tank, means for connecting said tanks together, a pump for circulating a solution of cyanid of potassium through said tanks and through said connecting means, leaching and filtering tanks, pipes for connecting the cyanid-tank with the leaching and filtering tanks near the lower portions thereof, filters located within the leaching and filtering tanks for removing suspended sedimentary deposits from the metallic solution of the cyanid of potassium, and means for depositing said metals dissolved in said solution.

6. An apparatus for extracting gold, silver and other metals from ores by a solution of cyanid of potassium, comprising a series of settling-tanks having partitions therein and communicating with each other near the upper portion thereof and provided with openings in the bottoms thereof, plugs removably secured in said openings, cyanid-tanks and means for connecting said tanks together, means for conveying the cyanid solution from the settling-tanks, a series of leaching and filtering tanks for receiving and extracting the sedimentary deposits from the cyanid solution, means for introducing compressed air into said leaching and filtering tanks and means for depositing the gold, silver and other metals contained in the said solution by electricity.

7. An apparatus for extracting gold, silver and other metals from ores by a solution of cyanid of potassium comprising a series of settling-tanks, a series of leaching and filtering tanks, means for connecting the said filtering-tanks together, filters for removing or separating the sedimentary deposits suspended in the said cyanid solution and means for depositing the metals in said solution by electricity.

In testimony whereof I have signed my name to this specification in the presence of two subscribing witnesses.

JOSEPH A. COMER.

Witnesses:
ANNA MORGAN,
S. A. LAVENDER.